(12) United States Patent
Martin

(10) Patent No.: US 6,334,515 B1
(45) Date of Patent: Jan. 1, 2002

(54) BRAKE DISK

(75) Inventor: Roland Martin, Weissach (DE)

(73) Assignee: Deutsches Zentrum für Luft-und Raumfahrt e.V., Bonn (DE)

( * ) Notice: Subject to any disclaimer, the term of this patent is extended or adjusted under 35 U.S.C. 154(b) by 523 days.

(21) Appl. No.: 08/751,980

(22) Filed: Nov. 19, 1996

(30) Foreign Application Priority Data

Nov. 24, 1995 (DE) .............................................. 195 43 799

(51) Int. Cl.[7] .................................................... F16D 65/12
(52) U.S. Cl. .................................................... 188/218 XL
(58) Field of Search ........................ 188/264 AA, 246 A, 188/18 A, 218 XL

(56) References Cited

U.S. PATENT DOCUMENTS

| | | | | |
|---|---|---|---|---|
| 2,708,492 A | * | 5/1955 | Helsten ................... | 188/218 XL |
| 3,295,641 A | * | 1/1967 | Eaton ..................... | 188/218 XL |
| 3,732,953 A | | 5/1973 | Huet | |
| 3,809,192 A | | 5/1974 | Stehle .................... | 188/218 XL |
| 4,132,294 A | * | 1/1979 | Poli ....................... | 188/218 XL |
| 4,745,996 A | * | 5/1988 | Wirth ..................... | 188/128 XL |
| 6,042,935 A | | 3/2000 | Krenkel et al. | |
| 6,086,814 A | | 7/2000 | Krenkel et al. | |

FOREIGN PATENT DOCUMENTS

| | | | |
|---|---|---|---|
| DE | 1822754 | 10/1960 | |
| DE | 2751887 | 5/1979 | |
| DE | 3224192 | 2/1983 | |
| DE | 4027677 | 3/1992 | |
| DE | 4417813 | 11/1995 | |
| DE | 44 45 226 A1 | 6/1996 | |
| DE | 195 43 799 | 3/1998 | |
| EP | 0374158 | 6/1990 | |
| EP | 0 717 214 B1 | 12/1999 | |
| FR | 2620499 | 3/1989 | |
| FR | 2620499 A1 | 3/1989 | |
| GB | 1433090 | 4/1976 | ............ 188/218 XL |
| JP | 58013237 A | 1/1983 | ............ 188/218 XL |
| JP | 0157840 | * 7/1986 | ............ 188/218 XL |
| JP | 61157840 A | 7/1986 | ............ 188/218 XL |
| SU | 0716895 | * 2/1980 | ............ 188/264 AA |

* cited by examiner

*Primary Examiner*—Matthew C. Graham
(74) *Attorney, Agent, or Firm*—Crowell & Moring, LLP

(57) ABSTRACT

A brake disk for disk brakes of vehicles is made of a material of the carbon group and the brake disk is formed as a ventilated brake disk made up of two individual friction rings which are undetachably connected with one another. The two friction rings are connected with one another by way of pins which have a thickened center part and end parts which are set off thereto. The end parts are fitted into respective bores in the friction rings.

2 Claims, 1 Drawing Sheet

BRAKE DISK

This invention relates to disk brakes of vehicles comprising material of the carbon group and the brake disk is formed a ventilated brake disk of two individual friction rings which are undetachably connected with one another. A brake disk of this general type is described in commonly assigned copending U.S. patent application Ser. No. 08/565,822, filed Dec. 1, 1995 now abandoned.

BACKGROUND AND SUMMARY OF THE INVENTION

From German Patent Document DE 32 24 192 A1 as well as European Patent Document EP 0 374 158 B1, brake disks are known which are constructed in one piece and consist of a carbon material or of carbon.

With respect to the embodiment of a brake disk discussed in the above-identified patent application which is made of a carbon or a carbon fiber reinforced plastic, it is described that the two friction rings can be connected with one another by way of ribs by means of a process.

It is an object of the invention to provide an improved and simpler possibility of connecting the two friction rings of a brake disk.

According to the invention, this object is achieved by providing a brake disk of the above-noted type, wherein the two friction rings are connected with one another by way of pins which have a thickened center part and have set-off end parts.

Principal advantages achieved by means of the invention are that, instead of being connected by way of the rib, as according to the above-noted patent application, the two friction rings are now connected only by way of cylindrical pins. A connection of these pins with the friction rings takes place in a know- manner, for example, in a high-vacuum furnace or the like in which an undetachable connection is established between the friction rings and the pins.

The pins are advantageously provided with a thickened center part and tapered end parts which project into bores of the two friction rings. These pins fix the two friction rings with respect to one another. The thickened center part supports the friction rings on a step so that an identical constant size air gap is formed between the friction rings.

The continuous ribs according to the main patent which form the air ducts are eliminated so that they are now replaced by distancing pieces. Half-ribs may still be provided.

Optionally, the bores for accommodating the end parts of the distancing pieces can be pocket bores or through-bores. A combination of these types of bores are also contemplated according to certain embodiments of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
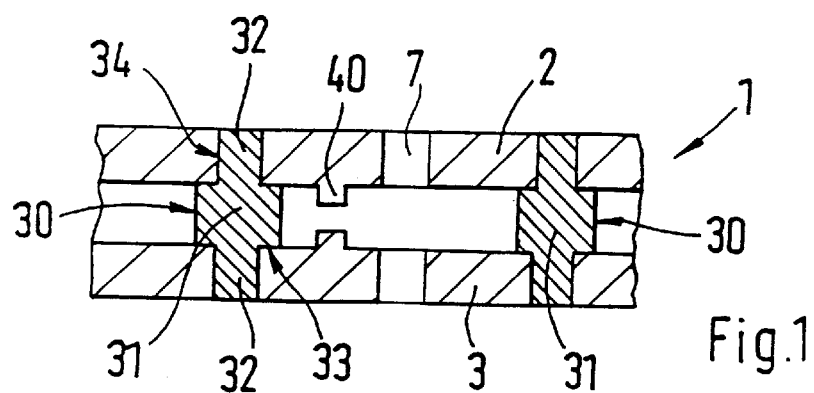
FIG. 1 is a sectional view of a brake disk with two friction rings and pins, taken along Line I—I of FIG. 2 and constructed according to a preferred embodiment of the present invention.
Figure 2:
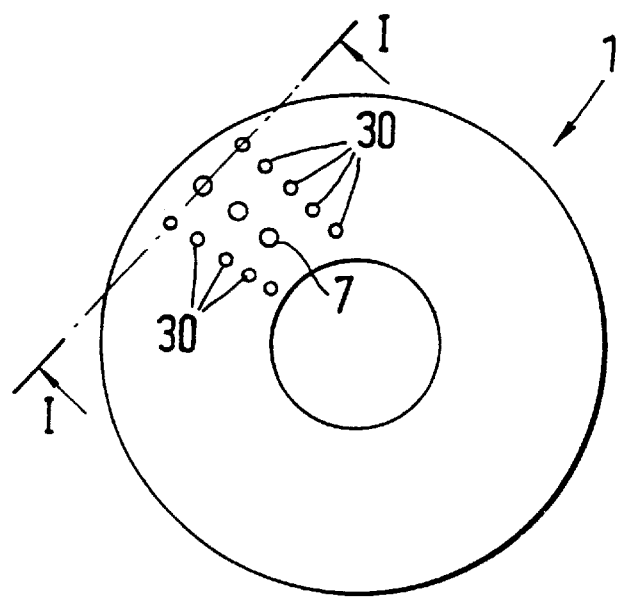
FIG. 2 is a top view of a brake disk with receiving bores for the pins and through-bores in the friction rings.

A ventilated brake disk 1 comprises two friction rings 2, 3 and a pot. The friction rings 2, 3 have through-bores 7.

A connection of the two friction rings 2, 3 takes place by way of pins 30 and/or 30a. Preferably, these have a cylindrical construction and a thickened center part 31 and end parts 32; 32a which have a smaller diameter in comparison to the center part 31.

Figure 3:
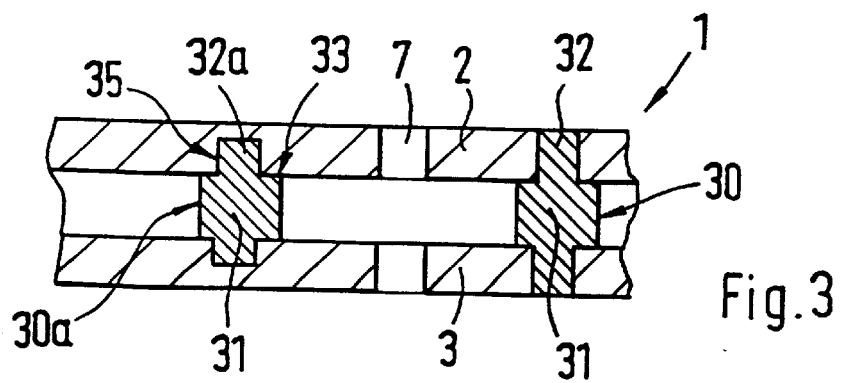
FIG. 3 is a sectional view of friction rings of a brake disk with a combined arrangement of receiving bores as pocket holes or as through-bores, constructed according to another preferred embodiment of the invention.

The end parts 32 project into bores of the friction rings 2,3 which may be constructed as pocket bores 35 (FIG. 3) or as through-bores 34. A combination of pocket bores 35 and through-bores 34 can also be selected which is shown in detail, for example, in FIG. 3.

Between the center part 31 and the end parts 32, one step 33 respectively is formed on which the friction rings 2, 3 can be supported.

The pins 30, 30a are placed in the brake disk 1 in such a manner that they result in quasi radially extending ducts which are defined by the center part 31 of the pins 30.

For connecting the two friction rings 2, 3 with one another, these are joined or fitted together by way of pins 30, 30a and are then connected with one another in a high vacuum furnace by gluing or the like.

In addition to the pins 30, 30a, the friction rings 2, 3 may in each case also have half-ribs 40 on the interior side which can be placed according to the requirements with respect to stability and vibration behavior.

The pins 30, 30a are distributed in a uniform pattern over the surface of the friction rings 2, 3 to thereby provide a uniform spacing of the rings 2, 3 over the facing surfaces.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A brake disk for a vehicle disk brake comprising a material selected from the carbon group and configured as an internally ventilated brake disk, including:

a pair of friction rings, and a plurality of pins connecting the friction rings together, said friction rings being connected together only by said plurality of pins, said pins each having a thickened center part serving to space the friction rings from one another and respective end parts secured in respective bores in the friction rings by a heating process, wherein said pins serve exclusively to connect the friction rings to one another over respective facing surfaces of said friction rings, without requiring any connecting spacing ribs between said facing surfaces, and wherein the friction rings have a combination of through-bores and pocket bores for receiving respective end parts of the pins.

2. A brake disk for a vehicle disk brake comprising a material selected from the carbon group and configured as an internally ventilated brake disk, including:

a pair of friction rings, and a plurality of pins connecting the friction rings together, said friction rings being connected together only by said plurality of pins, said pins each having a thickened center part serving to space the friction rings from one another and respective end parts secured in respective bores in the friction rings by a heating process, wherein said pins serve exclusively to connect the friction rings to one another over respective facing surfaces of said friction rings, without requiring any connecting spacing ribs between said facing surfaces, wherein the end parts each project into respective bores of the two friction rings and the thickened center part forms a support by way of steps, with a precise spacing between the two friction rings formed by the steps, and wherein the friction rings have a combination of through-bores and pocket bores for receiving respective end parts of the pins.

\* \* \* \* \*

UNITED STATES PATENT AND TRADEMARK OFFICE
CERTIFICATE OF CORRECTION

PATENT NO. : 6,334,515 B1  Page 1 of 1
DATED : January 1, 2002
INVENTOR(S) : Walter Krenkel et al.

It is certified that error appears in the above-identified patent and that said Letters Patent is hereby corrected as shown below:

<u>Title page,</u>
Item [75], inventorship is corrected to read
-- [75] Inventors: Walter Krenkel, Renningen (DE);
                Richard Kochendörfer, Stuttgart (DE) --

Signed and Sealed this

Sixth Day of August, 2002

*Attest:*

*Attesting Officer*

JAMES E. ROGAN
*Director of the United States Patent and Trademark Office*